United States Patent
Park et al.

(10) Patent No.: US 9,668,275 B2
(45) Date of Patent: May 30, 2017

(54) METHOD AND APPARATUS FOR REPORTING CHANNEL STATE BY REFLECTING INTERFERENCE CANCELLATION PERFORMANCE

(71) Applicant: LG Electronics Inc., Seoul (KR)

(72) Inventors: Hanjun Park, Seoul (KR); Kijun Kim, Seoul (KR); Hyungtae Kim, Seoul (KR); Yunjung Yi, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 111 days.

(21) Appl. No.: 14/626,107

(22) Filed: Feb. 19, 2015

(65) Prior Publication Data

US 2015/0264704 A1    Sep. 17, 2015

Related U.S. Application Data

(60) Provisional application No. 61/942,627, filed on Feb. 21, 2014.

(51) Int. Cl.
*H04W 72/12* (2009.01)
*H04L 5/00* (2006.01)

(52) U.S. Cl.
CPC ....... *H04W 72/1231* (2013.01); *H04L 5/0035* (2013.01); *H04L 5/0055* (2013.01); *H04L 5/0073* (2013.01); *H04W 72/1273* (2013.01)

(58) Field of Classification Search
CPC .................................................. H04W 72/1231
See application file for complete search history.

(56) References Cited

U.S. PATENT DOCUMENTS

| | | | |
|---|---|---|---|
| 2005/0201295 A1* | 9/2005 | Kim ..................... | H04L 1/0026 370/241 |
| 2010/0034093 A1* | 2/2010 | Roh ..................... | H04B 7/0417 370/241 |
| 2010/0227561 A1* | 9/2010 | Chakraborty ......... | H04L 5/0007 455/63.1 |
| 2011/0235533 A1* | 9/2011 | Breit ..................... | H04B 7/0452 370/252 |
| 2013/0294351 A1* | 11/2013 | Kwon ................... | H04W 24/10 370/328 |
| 2013/0322376 A1* | 12/2013 | Marinier ............... | H04W 72/06 370/329 |
| 2014/0133345 A1* | 5/2014 | Wang .................... | H04L 1/0026 370/252 |
| 2015/0146696 A1* | 5/2015 | Golitschek Edler Von Elbwart ............................. | H04W 24/10 370/335 |

* cited by examiner

*Primary Examiner* — Jason Mattis
(74) *Attorney, Agent, or Firm* — Morgan, Lewis & Bockius LLP

(57) ABSTRACT

Disclosed is a method for reporting a channel state in a wireless communication system, the method performed by a terminal and including reporting channel state information (CSI) to a base station (BS), transmitting CSI correction information for correcting the reported CSI, to the BS, and receiving a downlink channel scheduled based on the CSI correction information, wherein the CSI correction information indicates a change in channel state due to dynamic interference.

8 Claims, 13 Drawing Sheets

METHOD AND APPARATUS FOR REPORTING CHANNEL STATE BY REFLECTING INTERFERENCE CANCELLATION PERFORMANCE

This application claims the benefit of U.S. Provisional Application No. 61/942,627, filed on Feb. 21, 2014, which is hereby incorporated by reference as if fully set forth herein.

BACKGROUND OF THE INVENTION

Field of the Invention

The present invention relates to a wireless communication system and, more particularly, to a method and apparatus for reporting a channel state by reflecting interference cancellation performance.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method and apparatus for reporting a channel state by reflecting interference cancellation performance that substantially obviates one or more problems due to limitations and disadvantages of the related art.

An object of the present invention is to provide a method and apparatus for reporting a channel state by reflecting interference cancellation performance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for reporting a channel state in a wireless communication system is performed by a terminal and includes reporting channel state information (CSI) to a base station (BS), transmitting CSI correction information for correcting the reported CSI, to the BS, and receiving a downlink channel scheduled based on the CSI correction information, wherein the CSI correction information indicates a change in channel state due to dynamic interference.

Alternatively or additionally, the CSI correction information may include an indicator indicating whether a difference between most recently reported CSI and CSI of a specific timing is within a range in which the BS is able to correct CSI.

Alternatively or additionally, the method may further include receiving information about a range in which the BS is able to correct CSI, from the BS through higher layer signaling.

Alternatively or additionally, The CSI correction information may include indicators indicating a plurality of ranges corresponding to a difference between most recently reported CSI and CSI of a specific timing, and the plurality of ranges may include one or more ranges belonging to a range in which the BS is able to correct CSI, and a range in which the BS is not able to correct CSI.

Alternatively or additionally, the CSI correction information may be transmitted as a combination of acknowledgement/negative acknowledgement (ACK/NACK) feedback information and an uplink resource selected to transmit the ACK/NACK feedback information.

Alternatively or additionally, if the CSI correction information uses 2 or more bits, each bit consisting of the CSI correction information may be transmitted based on different transmission periods and transmission offsets.

In another aspect of the present invention, a terminal configured to report a channel state in a wireless communication system includes a radio frequency (RF) unit, and a processor configured to control the RF unit, wherein the processor is configured to report channel state information (CSI) to a base station (BS), transmit CSI correction information for correcting the reported CSI, to the BS, and receive a downlink channel scheduled based on the CSI correction information, and wherein the CSI correction information indicates a change in channel state due to dynamic interference.

Alternatively or additionally, the CSI correction information may include an indicator indicating whether a difference between most recently reported CSI and CSI of a specific timing is within a range in which the BS is able to correct CSI.

Alternatively or additionally, the processor may be further configured to receive information about a range in which the BS is able to correct CSI, from the BS through higher layer signaling.

Alternatively or additionally, the CSI correction information may include indicators indicating a plurality of ranges corresponding to a difference between most recently reported CSI and CSI of a specific timing, and the plurality of ranges may include one or more ranges belonging to a range in which the BS is able to correct CSI, and a range in which the BS is not able to correct the CSI.

Alternatively or additionally, the CSI correction information may be transmitted as a combination of acknowledgement/negative acknowledgement (ACK/NACK) feedback information and an uplink resource selected to transmit the ACK/NACK feedback information.

Alternatively or additionally, if the CSI correction information uses 2 or more bits, each bit consisting of the CSI correction information may be transmitted based on different transmission periods and transmission offsets.

In another aspect of the present invention, a method for receiving a reported channel state in a wireless communication system is performed by a base station (BS) and includes receiving channel state information (CSI) from a terminal, receiving CSI correction information for correcting the received CSI, from the terminal, and transmitting a downlink channel scheduled based on the CSI correction information, wherein the CSI correction information indicates a change in channel state due to dynamic interference.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
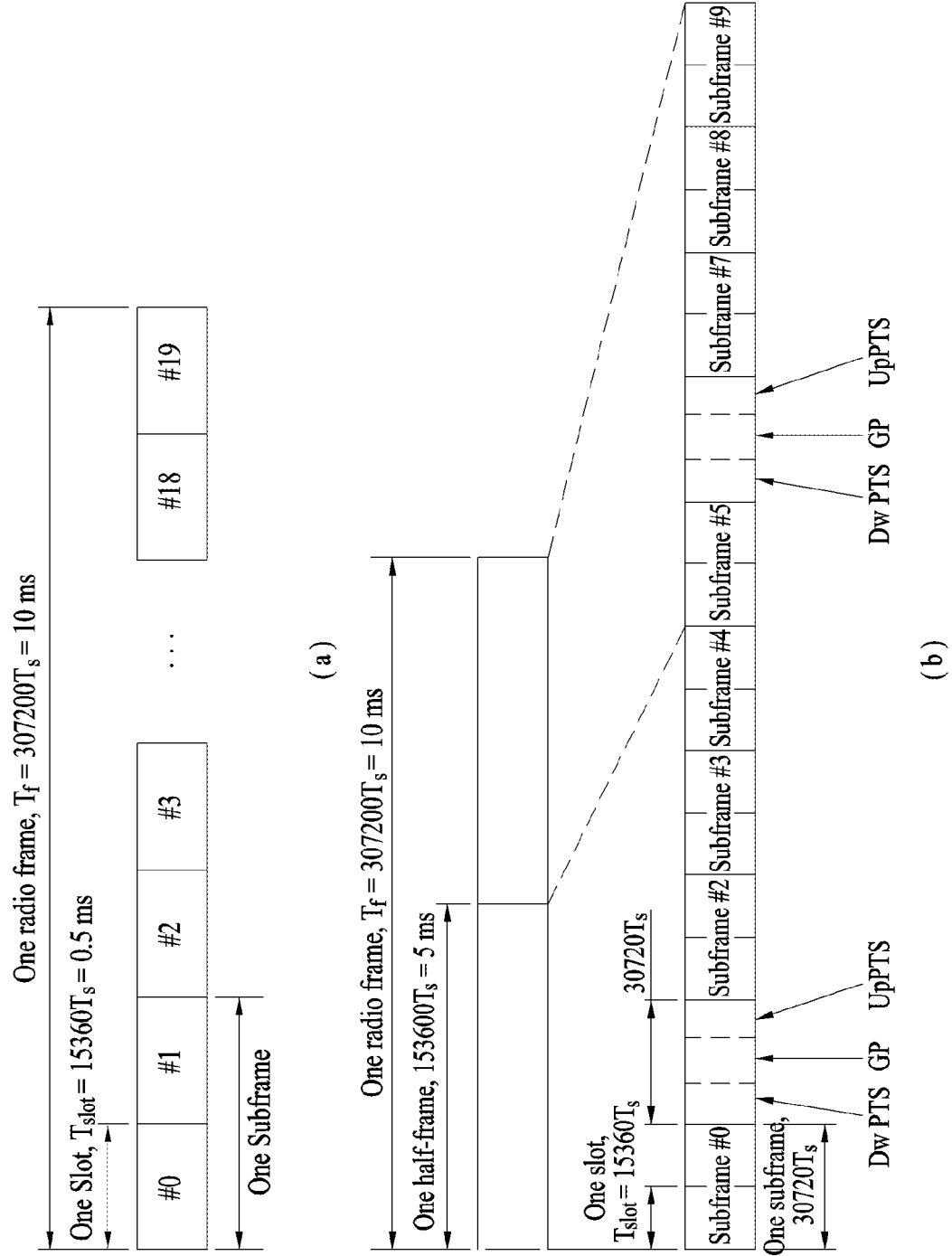
FIG. 1 illustrates an exemplary radio frame structure used in a wireless communication system.
Figure 2:
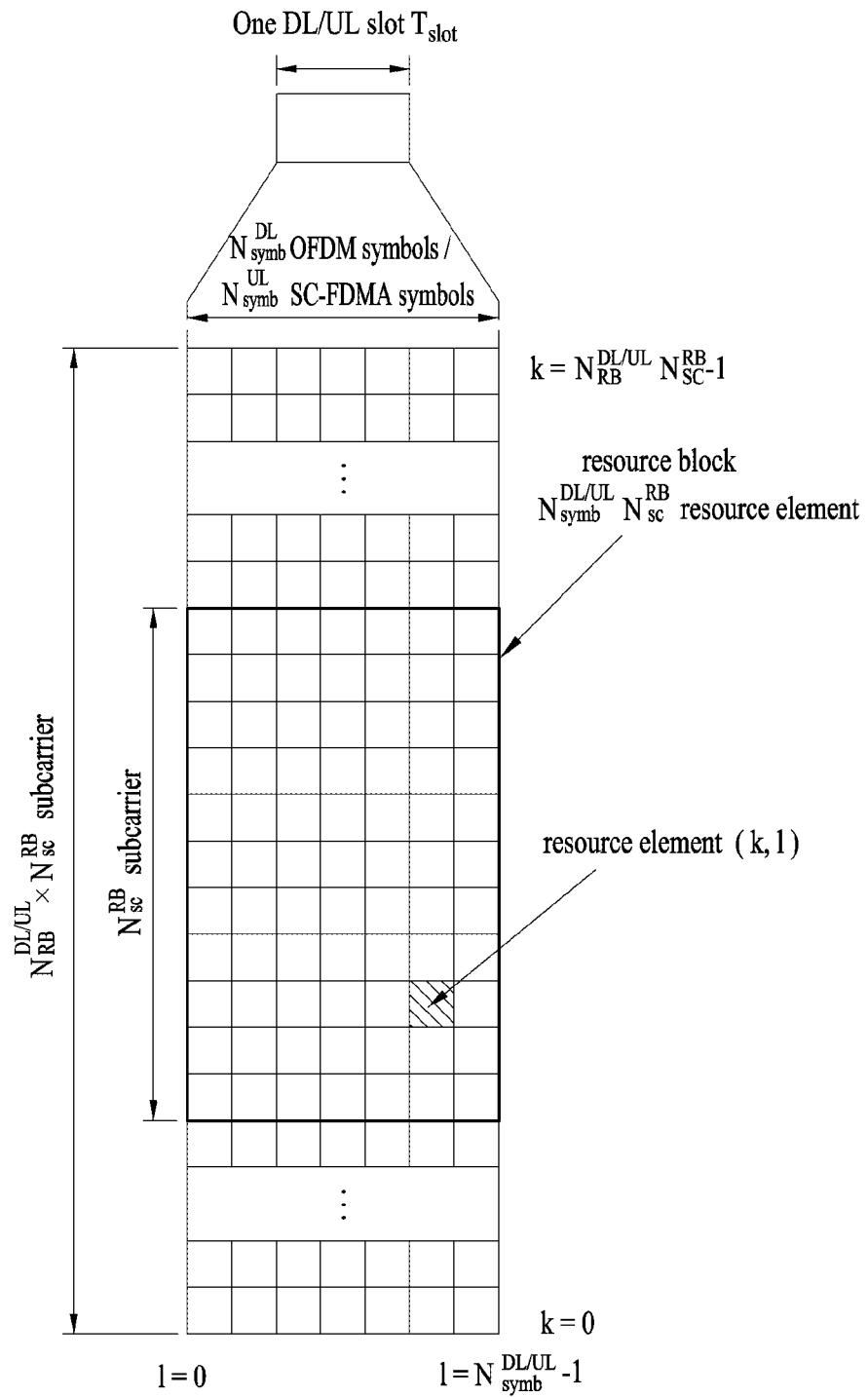
FIG. 2 illustrates exemplary downlink/uplink (DL/UL) slot structures used in a wireless communication system.
Figure 3:
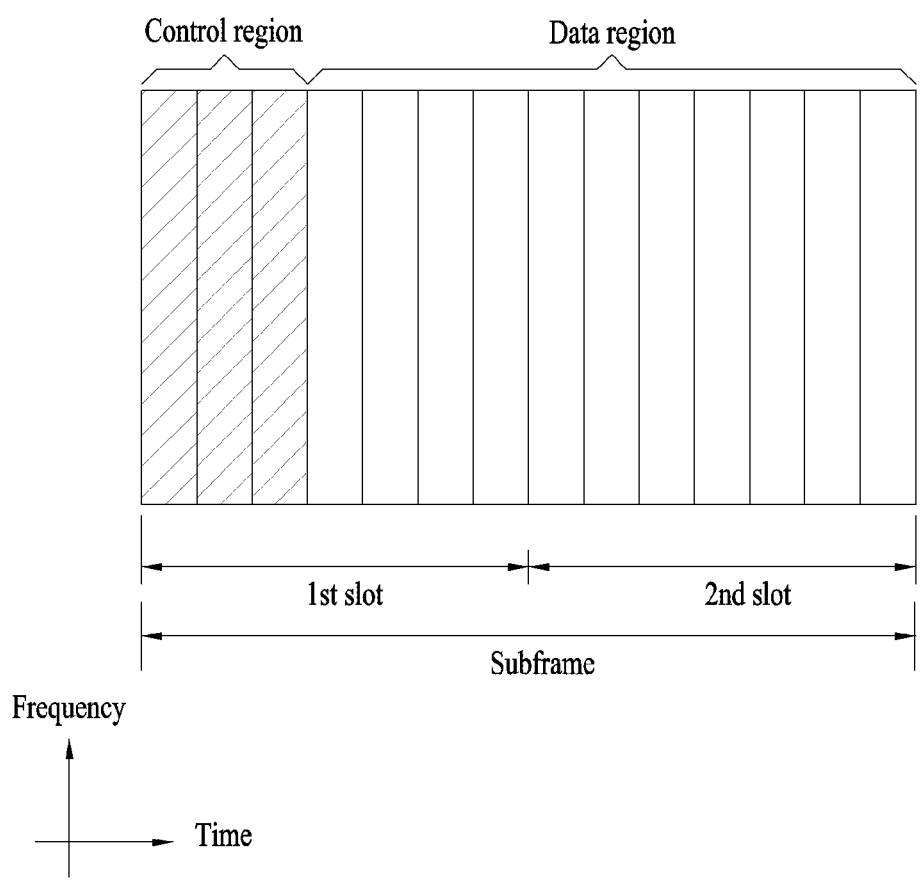
FIG. 3 illustrates an exemplary DL subframe structure used in a 3GPP LTE/LTE-A system.
Figure 4:
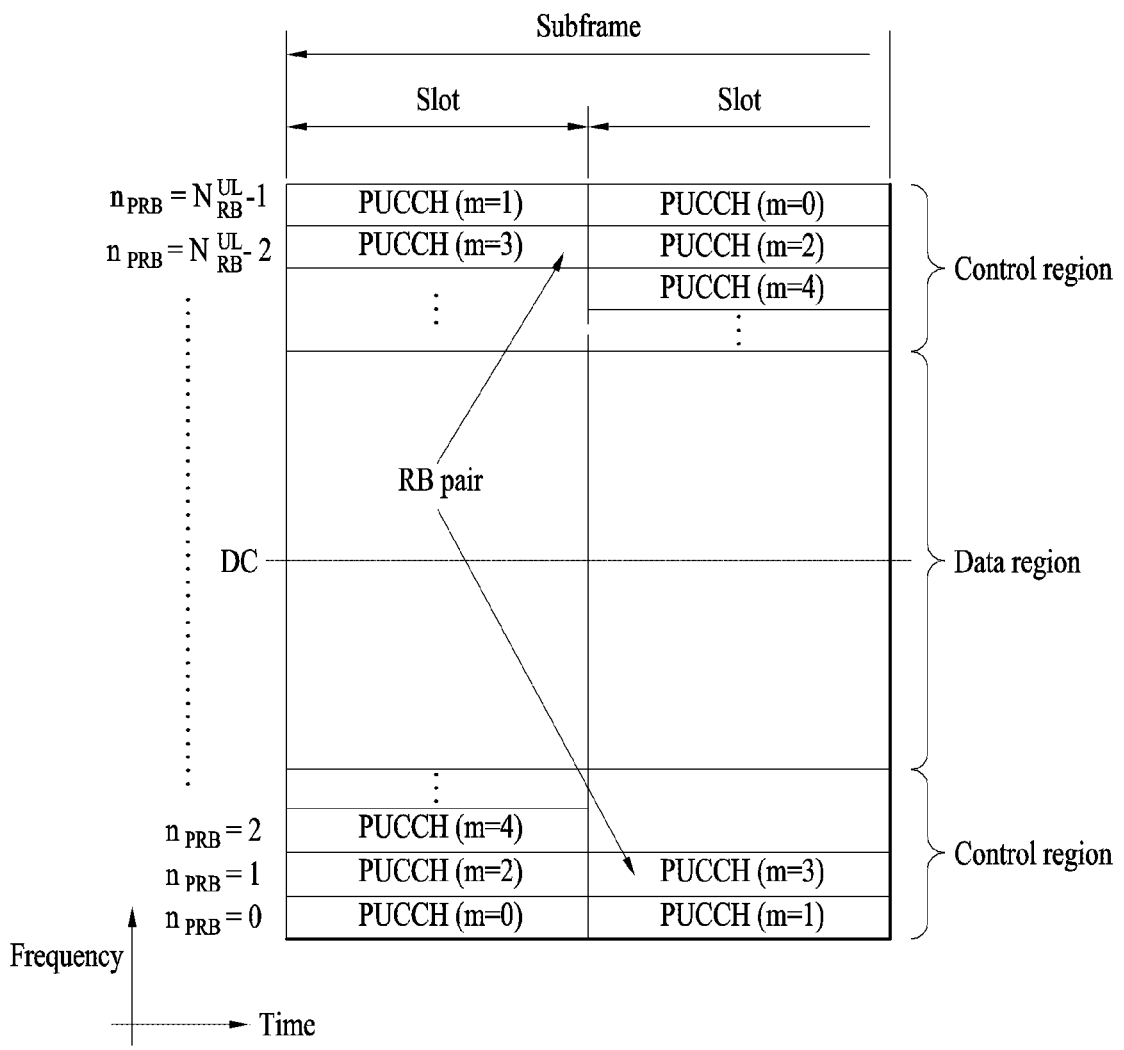
FIG. 4 illustrates an exemplary UL subframe structure used in a 3GPP LTE/LTE-A system.
Figure 5:
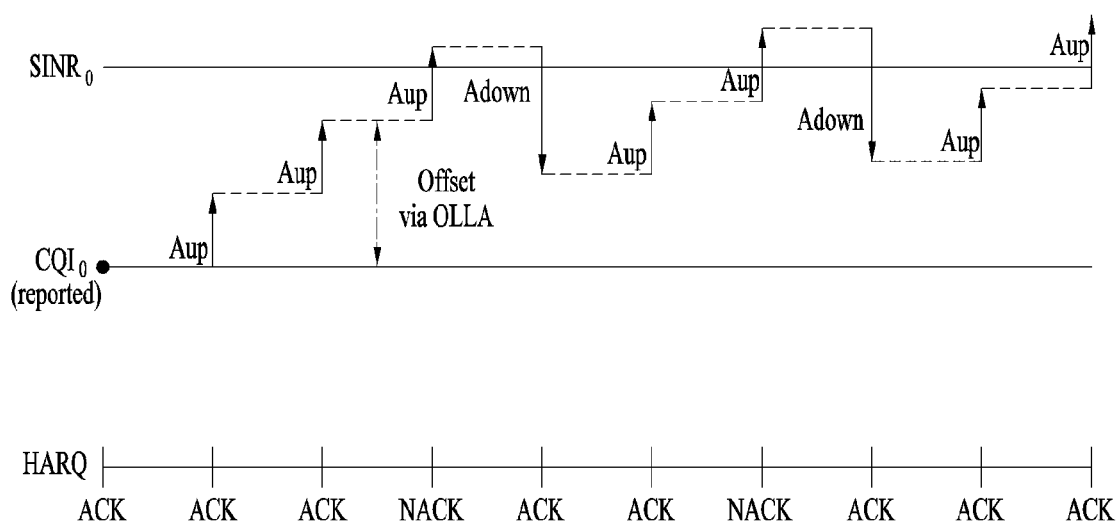
FIG. 5 illustrates a link adaptation scheme according to the related art.

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates an example of a wireless frame structure used in a wireless communication system;

FIG. 2 illustrates an example of a downlink/uplink (DL/UL) slot structure in a wireless communication system;

FIG. 3 illustrates an example of a downlink (DL) subframe structure used in a 3GPP LTE/LTE-A system;

FIG. 4 illustrates an example of an uplink (UL) subframe structure used in a 3GPP LTE/LTE-A system;

FIG. 5 illustrates an interference environment in a multi-cell environment.

Figure 6:
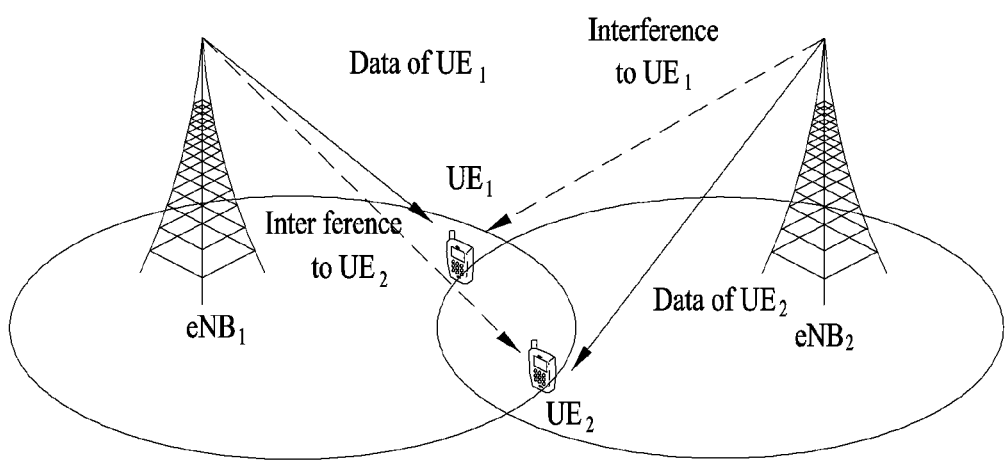
FIG. 6 illustrates an interference environment in a multi-cell environment.
Figure 7:
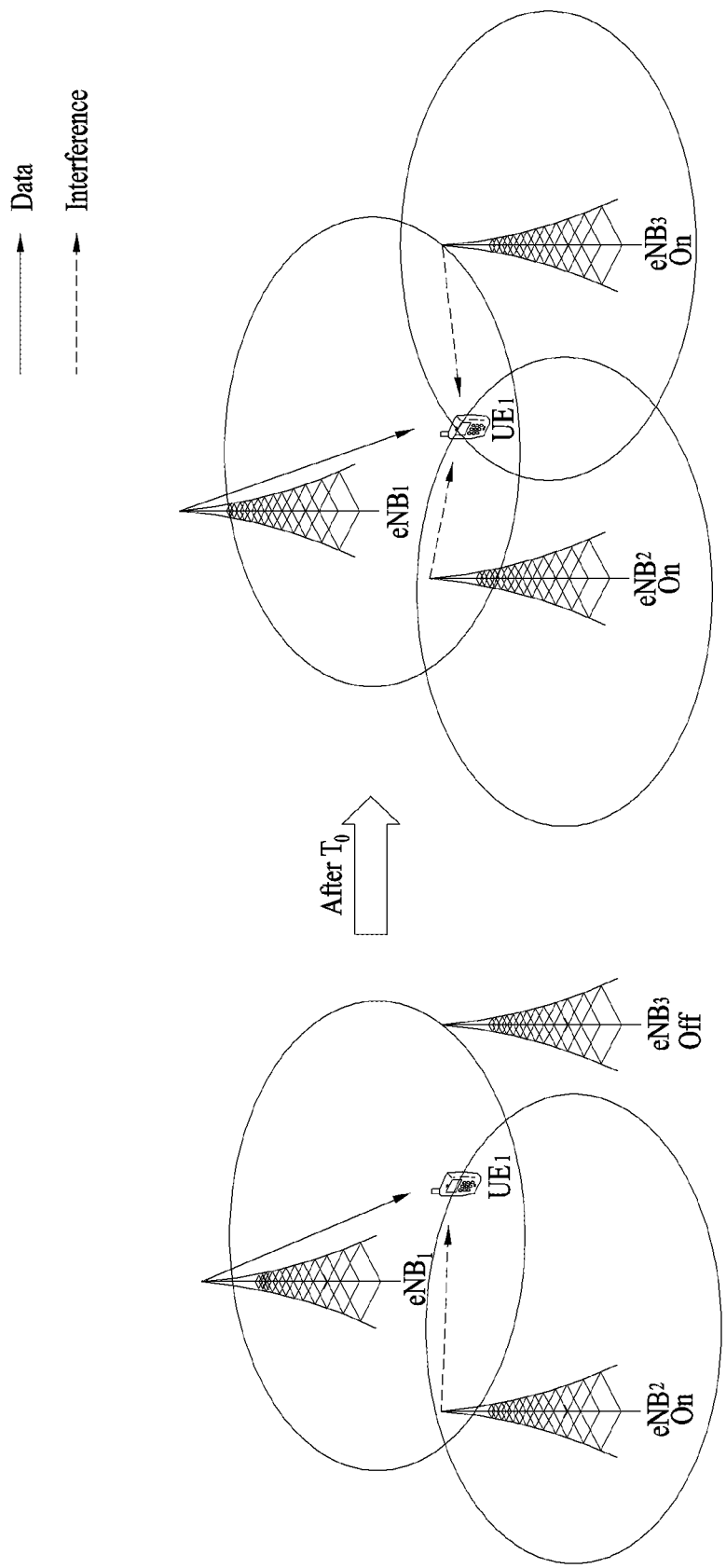
FIG. 7 illustrates a dynamic change in an interference environment.

FIG. 6 illustrates signaling of an interference configuration set according to an embodiment of the present invention;

FIG. 7 illustrates a pattern of channel state information-reference signal (CSI-RS).

FIG. 8 to FIG. 11 illustrate resources in which interference sequence signal is transmitted in accordance with an embodiment of the present invention.

Figure 12:
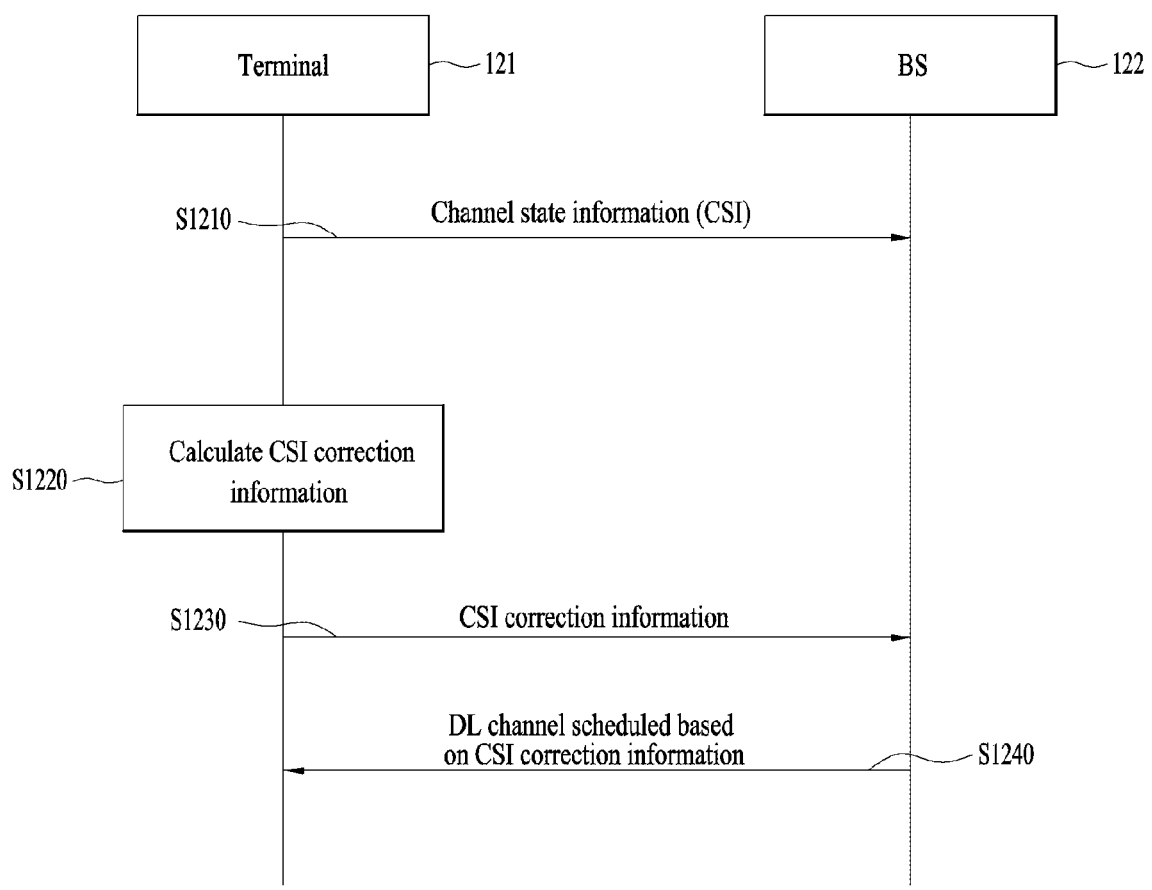
FIG. 12 illustrates operation according to an embodiment of the present invention.

FIG. 12 illustrates an operation in accordance with an embodiment of the present invention.

Figure 13:
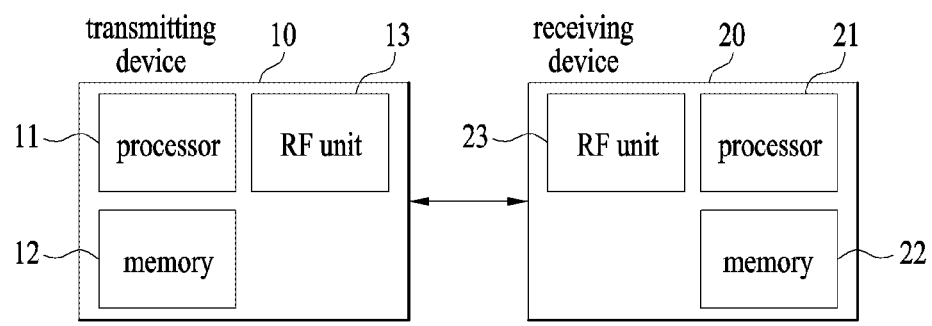
FIG. 13 is a block diagram of apparatuses for implementing embodiment(s) of the present invention.

FIG. 13 is a block diagram of an apparatus for embodying embodiment(s) of the present invention.

DETAILED DESCRIPTION OF THE INVENTION

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Aggregation Level L | Search Space Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

CSI-RS(Channel State Information-reference Signal)

In 3GPP LTE(-A), the antenna port configured to transmit CSI-RS is referred to as a CSI-RS port, and the position of a resource contained in a predetermined resource region in which CSI-RS port(s) transmit(s) the corresponding CSI-RS(s) is referred to as a CSI-RS pattern or a CSI-RS resource configuration. In addition, time-frequency resources through which CSI-RS is allocated/transmitted are referred to as CSI-RS resources. For example, a resource element (RE) used for CSI-RS transmission is referred to as CSI-RS RE. Unlike CRS in which the RE position at which CRS per antenna port is transmitted is fixed, CSI-RS has a maximum of 32 different constructions so as to reduce inter-cell interference (ICI) under a multi-cell environment including a heterogeneous network environment. Different CSI-RS constructions are made according to the number of antenna ports contained in the cell, and contiguous cells may be configured to have different structures. Unlike CRS, CSI-RS may support a maximum of 8 antenna ports (p=15, p=15,16, p=15, . . . , 18, and p=15, . . . , 22), and CSI-RS may be defined only for $\Delta f=15$ kHz. The antenna ports (p=15, . . . , 22) may correspond to CSI-RS ports (p=0, . . . , 7), respectively.

CSI-RS configuration may be varies according to the number of CSI-RS ports configured. There are 20 CSI-RS configurations if 2 CSI-RS ports are configured, there are 10 CSI-RS configurations if 4 CSI-RS ports are configured, and there are 5 CSI-RS configurations if 8 CSI-RS ports are configured. Numbers may be assigned to respective CSI-RS configurations defined by the number of CSI-RS ports.

The CSI-RS structures have nested property. The nested property may indicate that a CSI-RS structure for a large number of CSI-RS ports is used as a super set of a CSI-RS structure for a small number of CSI-RS ports. For example, REs configured to construct CSI-RS structure #0 regarding 4 CSI-RS ports are contained in resources configured to construct CSI-RS structure #0 regarding 8 CSI-RS ports.

A plurality of CSI-RSs may be used in a given cell. In the case of non-zero power CSI-RS, only CSI-RS for one structure is transmitted. In the case of zero-power CSI-RS, CSI-RS of a plurality of structures can be transmitted. From among resources corresponding to the zero-power CSI-RS, the UE proposes zero transmit (Tx) power for resources other than resources to be proposed as non-zero power CSI-RS. For example, in the case of a radio frame for TDD, no CSI-RS is transmitted in any one of a special subframe in which DL transmission and UL transmission coexist, a subframe in which a paging message is transmitted, and a subframe in which transmission of a synchronous signal, physical broadcast channel (PBCH) or system information block type 1 (SIB1) collides with CSI-RS. The UE assumes that no CSI-RS is transmitted in the above subframes. Meanwhile, time-frequency resources used by the CSI-RS port for transmission of the corresponding CSI-RS are not used for PDSCH transmission, and are not used for CSI-RS transmission of other antenna ports instead of the corresponding CSI-RS port.

Time-frequency resources used for CSI-RS transmission are not used for data transmission, such that a data throughput is reduced in proportion to the increasing CSI-RS overhead. Considering this fact, CSI-RS is not constructed every subframe, and the CSI-RS is transmitted at intervals of a predetermined transmission period corresponding to a plurality of subframes. In this case, compared to the case in which CSI-RS is transmitted every subframe, the amount of CSI-RS transmission overhead can be greatly reduced. The above-mentioned subframe will hereinafter be referred to as a CSI-RS subframe configured for CSI-RS transmission.

A base station (BS) can inform a UE of the following parameters through higher layer signaling (e.g., MAC signaling, RRC signaling, etc.).

Number of CSI-RS ports

CSI-RS structure

CSI-RS subframe configuration $I_{CSI-RS}$

CSI-RS subframe configuration period $T_{CSI-RS}$

CSI-RS subframe offset $\Delta_{CSI-RS}$

If necessary, the BS (or eNB) may inform the UE of not only a CSI-RS configuration transmitted at zero power, but also a subframe used for transmission of the zero-power CSI-RS configuration.

CSI-IM (Interference Measurement)

For the 3GPP LTE Rel-11 UE, one or more CSI-IM resource structures may be configured. CSI-IM resource may be used to measure interference. The CSI-RS structure and the CSI-RS subframe structure (ICSI-RS) shown in FIG. 5 may be configured through higher layer signaling for each CSI-IM resource.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

In an evolved wireless communication system such as LTE Rel-12, etc., a network assisted interference cancellation and suppression (NAICS) scheme for cancelling interference from an adjacent eNB by the UE based on help of a network has been discussed. FIG. 5 illustrates an interference environment in which data transmitted to $UE_1$ from $eNB_1$ exerts interference effect on $UE_2$ and simultaneously data transmitted to $UE_2$ from $eNB_2$ exerts interference effect on $UE_1$ when $UE_1$ served by $eNB_1$ and $UE_2$ served by $eNB_2$ are present in an LTE system. In FIG. 5, for an NAICS scheme, $UE_1$ or $UE_2$ may attempt to demodulate or decode data of an adjacent eNB and then mitigate interference effect upon succeeding in cancelling interference data from the received signal.

A wireless communication system such as LTE receives CSI feedback from a UE to determine a data transmission scheme such as scheduling, precoding or modulation and coding scheme (MCS). For example, in LTE Rel-11, an eNB allocates a channel state information (CSI)-reference signal (RS) for data channel measurement and a CSI-interference measurement (IM) resource for interference measurement to the UE for the CSI feedback. In this case, a combination of a single CSI-RS and a single CSI-IM resource may be defined as a CSI process. The UE having received allocation of the CSI process measures spatial characteristics and reception power of a received signal based on the CSI-RS, measures spatial characteristics and interference power of an interference signal based on the CSI-IM resource, determines a rank indicator (RI), a precoding matrix indicator (PMI), and a channel quality indicator (CQI) of the corresponding CSI process, and reports the determined information to the eNB. In the LTE Rel-11 system, the UE may receive allocation of a plurality of CSI processes to receive data transmitted from a plurality of cells based on a coordinated multiple point transmission/reception (CoMP) scheme. Furthermore, the UE feeds back the CSI acquired in each CSI process to the eNB based on an independent period and subframe offset.

The CQI of the CSI feedback information refers to a signal to interference and noise ratio (SINR) measured by the UE, and the eNB determines an MCS level appropriate for a channel state, i.e., link state, of the UE based on the CQI information. A scheme for performing link adaptation based on the SINR information measured as described above is referred to as inner loop link adaptation (ILLA). However, the accuracy of the CQI is lowered compared to an actual SINR value due to a problem such as a measurement error of the UE, a transmission delay of the CSI, or a quantization error of the CSI feedback. Accordingly, the eNB cannot trust the accuracy of the CSI feedback of the UE and thus performs correction to maintain a packet error rate (PER) required by the system. A scheme therefor considered in the LTE system is a link adaptation scheme for increasing a SINR offset in the case of ACK of a transmitted packet or reducing the SINR offset in the case of NACK of the transmitted packet, and ultimately determining an MCS level based on a value obtained by applying the SINR offset to a CQI. Such link adaptation scheme is called outer loop link adaptation (OLLA). Specifically, for example, the relation between the SINR offset and the PER in the OLLA scheme may be expressed as given below.

$$PER=1/(1+A_{down}/A_{up}).$$ [Equation 1]

Here, $A_{up}$ denotes an increment of the SINR offset in dB in the case of ACK, and $A_{down}$ denotes a decrement of the SINR offset in dB in the case of NACK. For example, it is assumed that an actually measured SINR is denoted by $SINR_0$ and a fed back SINR is denoted by $CQI_0$. OLLA operation in the case of $SINR_0 > CQI_0$ is illustrated in FIG. 6.

Referring to FIG. 6, the $CQI_0$ value is increased by $A_{up}$ in the case of ACK. As such, since the UE is scheduled based on the increased $CQI_0$ value and scheduling at a certain timing (after 3rd ACK is received in FIG. 6) follows the $CQI_0$ value exceeding $SINR_0$, NACK may be generated and the $CQI_0$ value is reduced by $A_{down}$ in the case of NACK. The above operation is repeated to perform scheduling which converges on $SINR_0$.

However, the CSI can greatly vary within a CSI feedback period depending on a traffic environment of a network. For example, FIG. 6 illustrates a change in traffic of a multi-cell environment.

FIG. 7 illustrates that interference on $UE_1$ varies depending on whether neighboring eNBs transmit signals, when $eNB_1$, $eNB_2$ and $eNB_3$ are present and $UE_1$ receives data from $eNB_1$ and $eNB_2$. That is, although $eNB_3$ services no data and thus only $eNB_2$ gives interference on $UE_1$ at a timing corresponding to the left part of FIG. 7, after a time $T_0$, $eNB_3$ also transmits a new data packet and thus $UE_1$ receives strong interference. Assuming that the UE has performed CSI feedback at the timing corresponding to the left part of FIG. 7, after the time $T_0$, the CSI feedback may not reflect the network environment of a current timing due to interference of $eNB_3$.

Furthermore, if the UE performs an advanced receiver scheme such as an IC scheme, the CSI feedback may further vary. For example, if the UE performs CSI feedback assuming that the IC scheme is applied for $eNB_2$ at the timing corresponding to the left part of FIG. 7, and then $eNB_3$ newly gives interference due to a change in network traffic and thus the IC scheme does not validly operate in a CSI feedback period, the CSI feedback may reflect neither newly generated interference of $eNB_3$ nor interference of $eNB_2$ based on failure of the IC scheme. In this case, a variation in CQI can be slowly corrected in an outer loop link adaptation (OLLA) scheme performed by the eNB. However, if a severe variation occurs in the CSI, an RI value as well as the CQI can also vary. For example, although the CSI of the timing corresponding to the left part of FIG. 7 is reported to support rank 2, after the time $T_0$, the performance of rank 2 may not be appropriately achieved due to interference of $eNB_3$.

Furthermore, Rel-12 discusses that improvement of CSI feedback based on a result of NAICS should always be reflected in a CSI feedback procedure of a UE capable of performing NAICS. However, the CSI feedback in which the result of NAICS is reflected can depend largely on characteristics of an interference signal on which NAICS is to be performed at a corresponding timing, and this means that the CSI feedback of a NAICS UE can greatly vary depending on the change in interference signal characteristics due to, for example, link adaptation or scheduling of the interfering cell. As described above, the CSI can have a large variation range depending on a change in network traffic and a result of an IC scheme, and inconsistency between CSI feedback and actual CSI caused thereby can reduce system performance.

Accordingly, the present invention proposes a method for receiving feedback of a plurality of CSI data assuming a plurality of interference signal characteristics by a serving cell for providing data service to the NAICS UE, and feeding back an appropriate CSI index x among the plurality of CSI data by recognizing a change in the interference signal characteristics at a current timing, or feeding back information indicating whether the CSI varies or an interference change indication (ICI) directly indicating a change in an interference environment, to the serving cell by the NAICS UE.

According to an embodiment of the present invention, a method using CSI processes may be considered as a method for acquiring CSI indicating changes in traffic and interference signal characteristics, which can be experienced by the NAICS UE. That is, the serving cell may configure a plurality of CSI processes for the NAICS UE, cause artificial interference by assuming specific traffic and interference signal characteristics in a CSI-interference measurement (IM) resource of each CSI process, and thus receive CSI feedback in a virtual environment. For example, it is assumed that an interference signal assuming rank 1 is transmitted from neighboring cell 1 using a CSI-IM resource in CSI process 1. Then, when information about a timing at which the neighboring cell 1 actually transmits interference data of rank 1 based on inter-cell coordination is acquired, the serving cell may perform link adaptation of the NAICS UE using the CSI based on the CSI process 1 at the corresponding timing.

According to an embodiment of the present invention, a description is now given of a method for configuring a single CSI feedback process as a reference process for the NAICS UE, and additionally configuring a CSI increment table by the serving cell to calculate a plurality of CSI data for the NAICS UE. Initially, the serving cell may configure a reference CSI feedback process for the NAICS UE. For example, the reference CSI feedback process may be a CSI feedback process in a case when NAICS is not performed. Then, the serving cell may additionally configure the CSI increment table for the NAICS UE as shown below, and the NAICS UE may feed back bits (i.e., b(0)b(1)) corresponding to an increment value to the serving cell.

TABLE 5

| ΔCQI | b(0)b(1) |
|---|---|
| =0 | 00 |
| +2 | 01 |
| +4 | 10 |
| Reserved | 11 |

The serving cell may configure a plurality of CSI data for a specific NAICS UE using the reference CSI feedback process and the above table. In this case, a variation range of the CSI in the above table may be configured for the NAICS UE by the serving cell through higher layer signaling.

A description is now given of a feedback method for correcting the above-described inconsistency in CSI feedback at a CSI feedback timing and a scheduling timing.

According to another embodiment of the present invention, a description is now given of a method for feeding back N bits indicating whether data transmission statuses from N cells are changed compared to a previous CSI feedback timing, as the ICI information to the serving cell when the NAICS UE is configured by the serving cell to observe the data transmission statuses from the N cells. As described above, a data transmission status of each cell can vary at every moment in a dynamic traffic environment. Accordingly, the present invention considers a method for expressing information indicating whether the data transmission status of each of the N cells is changed, as 1 bit, and feeding back a total of N bits to the serving cell by the NAICS UE, as a method for expressing the ICI indicating a change in an interference environment. For example, in FIG. 7, it is assumed that $UE_1$ feeds back information indicating whether data transmission statuses of $eNB_2$ and $eNB_3$ are changed. In this case, it is also assumed that CSI feedback is performed at the timing corresponding to the left part of FIG. 7 and the interference environment is changed as shown in the right part of FIG. 7 after the time $T_0$. In this case, $eNB_2$ may signal '0' state in which the data transmission status thereof is maintained, $eNB_3$ may signal '1' state in which the data transmission status thereof is changed, to $eNB_1$ which is a serving cell thereof. The 1 bit may indicate whether the data transmission status of each cell is changed compared to previous CSI feedback.

According to another embodiment of the present invention, a description is now given of a method for feeding back information indicating which CSI process is appropriate at a current transmission timing by the NAICS UE when a plurality of CSI processes based on a plurality of interference signal characteristics are configured for the NAICS UE by the serving cell. In an LTE system according to an embodiment of the present invention, the serving cell may configure a plurality of CSI processes and thus receive feedback of virtual CSI to be experienced by the NAICS UE based on changes in traffic and interference signal characteristics. In this case, since the CSI processes feed back the CSI assuming a virtual environment, the serving cell should know about which CSI process is appropriate at a current transmission timing. Although the above-mentioned inter-cell coordination scheme can be used here, if the inter-cell coordination scheme uses a backhaul network, dynamic scheduling is not enabled due to a transmission delay generated by the backhaul network and thus scheduling can be restricted. Accordingly, the present invention proposes a method for feeding back an index of an appropriate CSI process of a current timing by the NAICS UE to allow the serving cell to check a CSI process appropriate for a current traffic and interference environment without additionally performing inter-cell coordination.

According to another embodiment of the present invention, a description is now given of a method for configuring a maximum allowable value of a variation range of CSI for the NAICS UE by the serving cell of the NAICS UE, and comparing CSI of a current timing to most recently fed back CSI and feeding back information indicating whether the difference therebetween exceeds the allowable range, as a 1-bit indicator to the serving cell by the NAICS UE. The allowable range may be configured to correspond to a maximum range in which the serving cell can correct the CSI. The maximum allowable value of the variation range of the CSI which is configured by the serving cell may be preliminarily configured for the NAICS UE through higher layer signaling such as RRC signaling, and the UE signals only information indicating whether the CSI greatly varies, to the serving cell. For example, when an RI varies compared to a previous CSI feedback timing, the NAICS UE may feed back '1' indicating that the CSI varies, as a 1-bit indicator to the serving cell. Then, the serving cell recognizes the variation in the CSI and may trigger, for example, aperiodic CSI feedback of the NAICS UE, receive feedback of new CSI from the NAICS UE, and correct or update the CSI information. When the CSI is corrected or updated, the serving cell may correspondingly change scheduling of the NAICS UE.

According to another embodiment of the present invention, a description is now given of a method for comparing CSI of a current timing to CSI of a most recent CSI feedback timing and feeding back information indicating to which state of a CSI increment table the difference between the CSI of the current timing and the most recently fed back CSI, as M bits to the serving cell when the serving cell configures a single CSI feedback process as a reference process for the NAICS UE and additionally configures the CSI increment table. Initially, the serving cell may configure the CSI increment table for the NAICS UE as shown below.

TABLE 6

| ΔCQI | b(0)b(1) |
|---|---|
| ΔCQI$_1$ | 00 |
| ΔCQI$_2$ | 01 |
| ΔCQI$_3$ | 10 |
| Out of range | 11 |

In this case, the NAICS UE may feed back information indicating how much the CSI of the current timing varies compared to the CSI of the previous CSI feedback timing, using M bits (e.g., 2 bits) to the serving cell. In this case, one of states indicated by the M bits may be used to indicate that the variation in the CSI exceeds the CSI increment table. For example, in the above table, '11' can mean that the CSI of the current timing which is measured by the NAICS UE varies from the recently reported CSI feedback by a value out of the range defined by the CSI increment table. In other words, in the above table, '00', '01' and '10' indicate ranges obtained by dividing a range in which the serving cell can correct the CSI, by 3, respectively, and '11' indicates a range in which the serving cell cannot correct the CSI.

The NAICS UE may transmit the M-bit indicator to the serving cell, and thus the serving cell may recognize the variation in the CSI and correct the CSI by a value corresponding to a range indicated by the M-bit indicator. When the CSI is corrected, the serving cell may correspondingly change scheduling of the NAICS UE. As such, inconsistency in CSI due to a change in an interference environment may be solved. However, if the M-bit indicator indicates '11' as in the above-described example, the serving cell may trigger, for example, aperiodic CSI feedback of the NAICS UE, receive feedback of new CSI from the NAICS UE, and correct or update the CSI information.

Alternatively, even when the variation in the CSI is within the range correctable by the serving cell, the serving cell may correct the CSI only if the variation in the CSI corresponds to or exceeds a specific range. Alternatively, when the variation in the CSI corresponds to or exceeds the specific range, the serving cell may trigger, for example, aperiodic CSI feedback of the NAICS UE, receive feedback of new CSI from the NAICS UE, and correct or update the CSI information.

A resource region observed by the NAICS UE for an indicator related to the variation in the CSI is basically configured as a resource region allocated to the NAICS UE for data transmission at a current timing, and may be configured by the serving cell through higher layer signaling such as RRC signaling as necessary.

The information fed back by the NAICS UE in the above description according to embodiments of the present invention (hereinafter referred to as "feedback for CSI adaptation or correction") may be transmitted by the NAICS UE in an additional feedback container based on a period configured by the network, or transmitted together with legacy ACK/NACK feedback. A description is now given of a method for transmitting the feedback for CSI adaptation or correction together with ACK/NACK feedback.

According to another embodiment of the present invention, a description is now given of a method for configuring a plurality of PUCCH resources (e.g., PUCCH format 1a/1b) each capable of transmitting up to 2 bits for 1 component carrier (CC), and expressing a data detection result (e.g., ACK/NACK) of the CC and the M bits using a combination of information carried by a feedback resource and information indicating which feedback resource is selected, when the M-bit feedback is transmitted and M is equal to or less than 2. The following operation is based on operation of a 3GPP LTE(-A) system.

A. 1 TB, M=1

Initially, 2 PUCCH resources (e.g., PUCCH 0 and PUCCH 1) are configured. In this case, PUCCH 0 may be configured as a PUCCH resource implicitly corresponding to the first CCE index of DCI for transmitting data of a TB, i.e., PUCCH 0 may be a resource determined by the first CCE index, and PUCCH 1 may be an additionally and explicitly configured resource. In this case, a PUCCH resource and feedback information transmitted based on a combination of a data detection result of the TB and the feedback for CSI adaptation or correction may be defined as given in the following table. Here, '0' of the feedback for CSI adaptation or correction denotes a small variation in CSI, and '1' of the feedback for CSI adaptation or correction denotes a large variation in CSI.

TABLE 7

| 1$^{st}$ TB | Feedback for CSI adaptation (1 bits) | PUCCH resource | b(0)b(1) |
|---|---|---|---|
| ACK | 0 | PUCCH 0 | 11 |
| NACK | 0 | PUCCH 0 | 00 |
| ACK | 1 | PUCCH 1 | 11 |
| NACK/DTX | 1 | PUCCH 1 | 00 |
| DTX | 0 | No transmission | |

Figure 8:
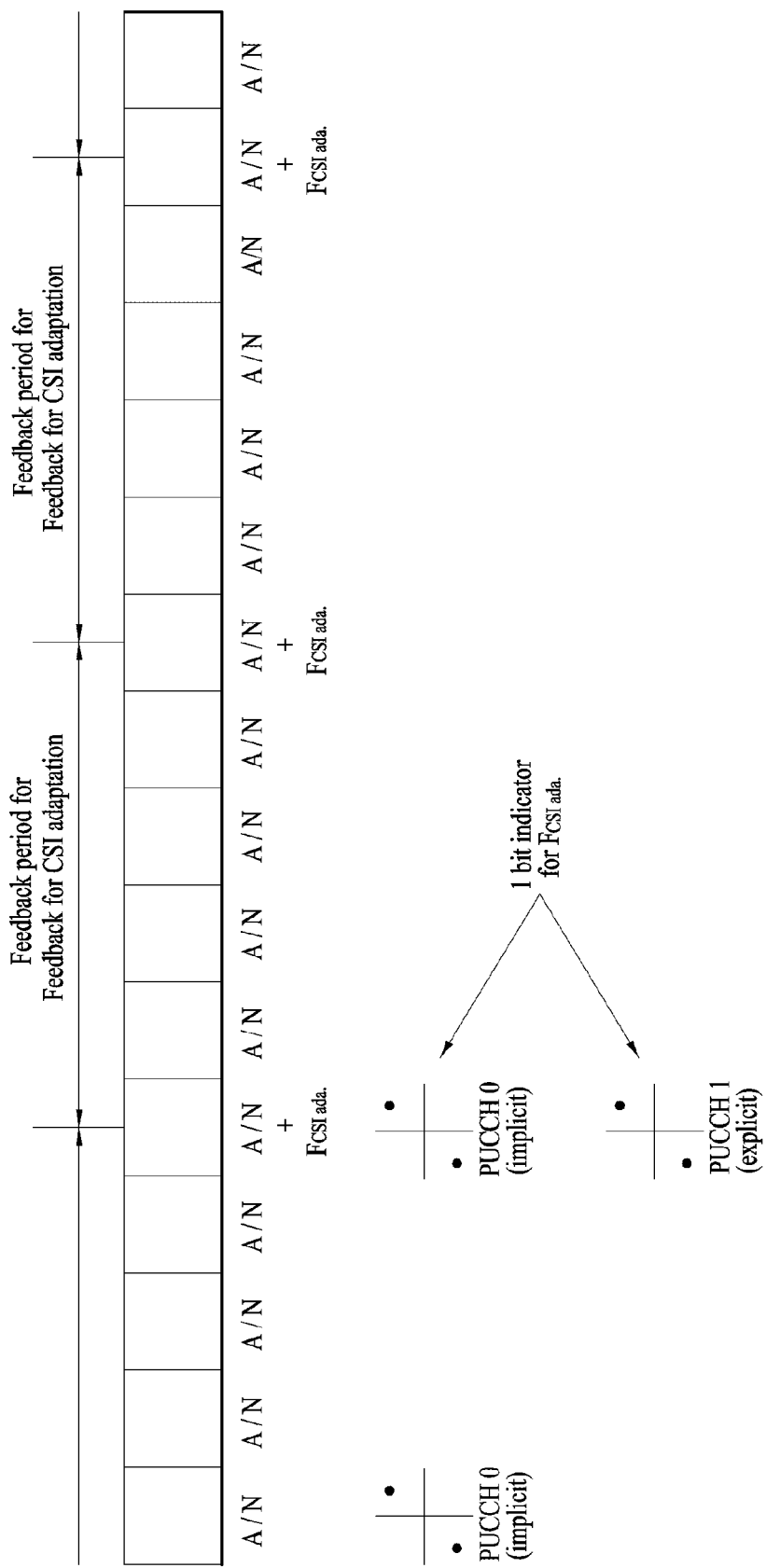
FIGS. 8 to 11 illustrate methods for transmitting channel state information (CSUI) correction information according to an embodiments of the present invention.

Feedback operation based on the above table is illustrated in FIG. 8. The feedback for CSI adaptation or correction may be transmitted in the last resource unit of a feedback period. That is, the feedback for CSI adaptation or correction may be periodically transmitted. A resource unit not configured with the feedback for CSI adaptation or correction may indicate only ACK/NACK of one TB and thus needs only PUCCH 0, and a resource unit configured with the feedback for CSI adaptation should indicate the feedback for CSI adaptation in addition to ACK/NACK information and thus needs both PUCCH 0 and PUCCH 1.

B. 2 TBs, M=1

Initially, 2 PUCCH resources (e.g., PUCCH 0 and PUCCH 1) are configured. In this case, PUCCH 0 may be configured as a PUCCH resource implicitly corresponding to the first CCE index of DCI for transmitting data of a TB, i.e., PUCCH 0 may be a resource determined by the first CCE index, and PUCCH 1 may be an additionally and explicitly configured resource. In this case, a PUCCH resource and feedback information transmitted based on a combination of a data detection result of the TB and the feedback for CSI adaptation may be defined as given in the following table. Here, '0' of the feedback for CSI adaptation denotes a small variation in CSI, and '1' of the feedback for CSI adaptation denotes a large variation in CSI.

TABLE 8

| 1$^{st}$ TB | 2$^{nd}$ TB | Feedback for CSI adaptation (1 bits) | PUCCH resource | b(0)b(1) |
|---|---|---|---|---|
| ACK | ACK | 0 | PUCCH 0 | 11 |
| ACK | NACK | 0 | PUCCH 0 | 10 |
| NACK | ACK | 0 | PUCCH 0 | 01 |
| NACK | NACK | 0 | PUCCH 0 | 00 |
| ACK | ACK | 1 | PUCCH 1 | 11 |

TABLE 8-continued

| 1st TB | 2nd TB | Feedback for CSI adaptation (1 bits) | PUCCH resource | b(0)b(1) |
|---|---|---|---|---|
| ACK | NACK | 1 | PUCCH 1 | 10 |
| NACK | ACK | 1 | PUCCH 1 | 01 |
| NACK/DTX | NACK/DTX | 1 | PUCCH 1 | 00 |
| DTX | DTX | 0 | No transmission | |

Figure 9:
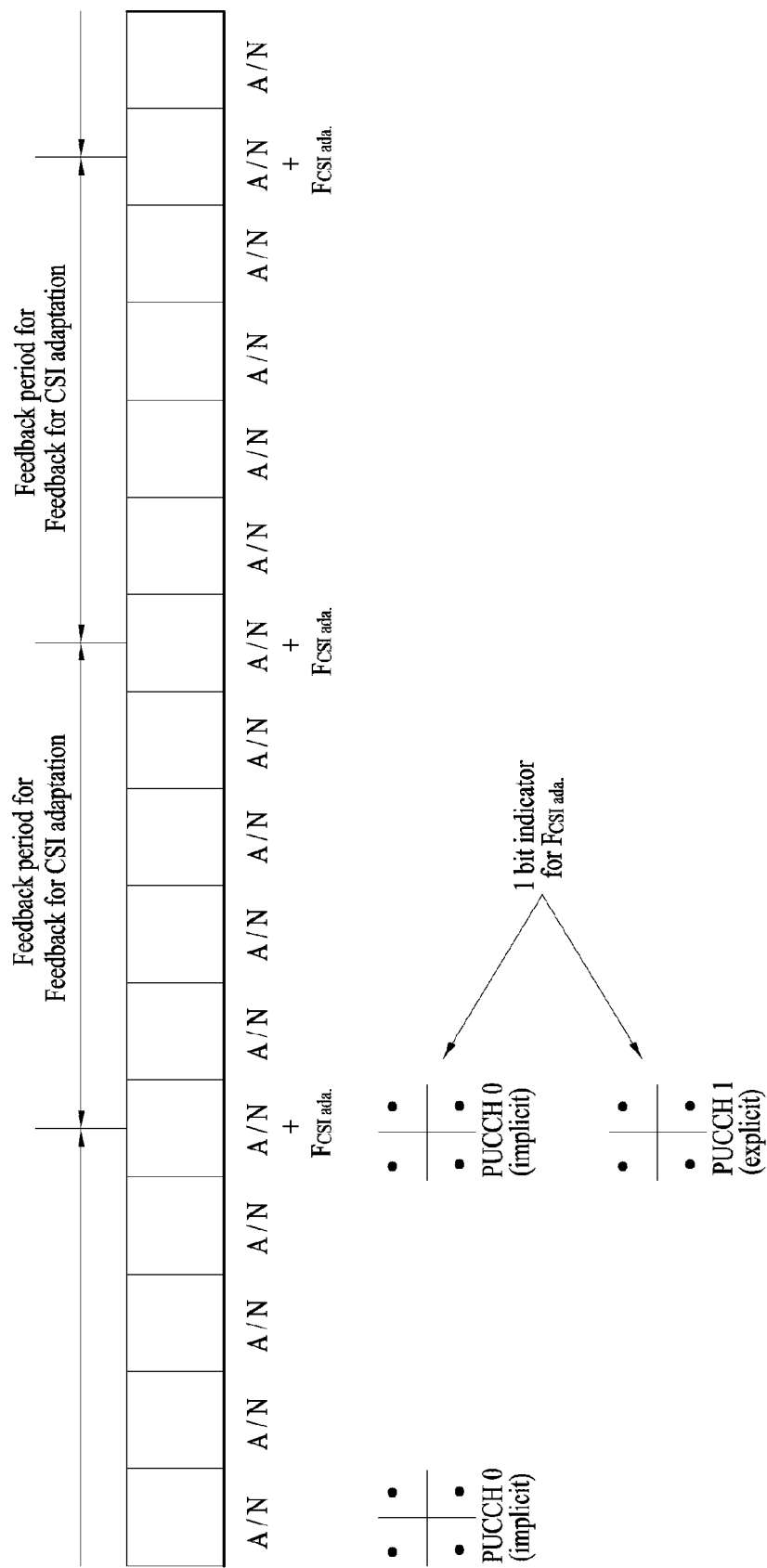

Feedback operation based on the above table is illustrated in FIG. 9.

C. 2 TBs, M=2

Initially, 3 PUCCH resources (e.g., PUCCH 0, PUCCH 1 and PUCCH 2) are configured. In this case, PUCCH 0 may be configured as a PUCCH resource implicitly corresponding to the first CCE index of DCI for transmitting data of a TB, i.e., PUCCH 0 may be a resource determined by the first CCE index, and PUCCH 1 and PUCCH 2 may be additionally and explicitly configured resources. In this case, a PUCCH resource and feedback information transmitted based on a combination of a data detection result of the TB and the feedback for CSI adaptation may be defined as given in the following table. Here, '00' of the feedback for CSI adaptation denotes a small variation in CSI, and the other values may denote specific variations in CSI mentioned according to the present invention.

TABLE 9

| 1st TB | 2nd TB | Feedback for CSI adaptation (1st bit) | Feedback for CSI adaptation (2nd bit) | PUCCH resource | b(0)b(1) |
|---|---|---|---|---|---|
| ACK | ACK | 0 | 0 | PUCCH 0 | 11 |
| ACK | NACK | 0 | 0 | PUCCH 0 | 10 |
| NACK | ACK | 0 | 0 | PUCCH 0 | 01 |
| NACK | NACK | 0 | 0 | PUCCH 0 | 00 |
| ACK | ACK | 1 | 0 | PUCCH 1 | 11 |
| ACK | NACK | 1 | 0 | PUCCH 1 | 10 |
| NACK | ACK | 1 | 0 | PUCCH 1 | 01 |
| NACK/DTX | NACK/DTX | 1 | 0 | PUCCH 1 | 00 |
| ACK | ACK | 0 | 1 | PUCCH 2 | 11 |
| ACK | NACK | 0 | 1 | PUCCH 2 | 10 |
| NACK | ACK | 0 | 1 | PUCCH 2 | 01 |
| NACK/DTX | NACK/DTX | 0 | 1 | PUCCH 2 | 00 |
| DTX | DTX | 0 | 0 | No transmission | |

Figure 10:
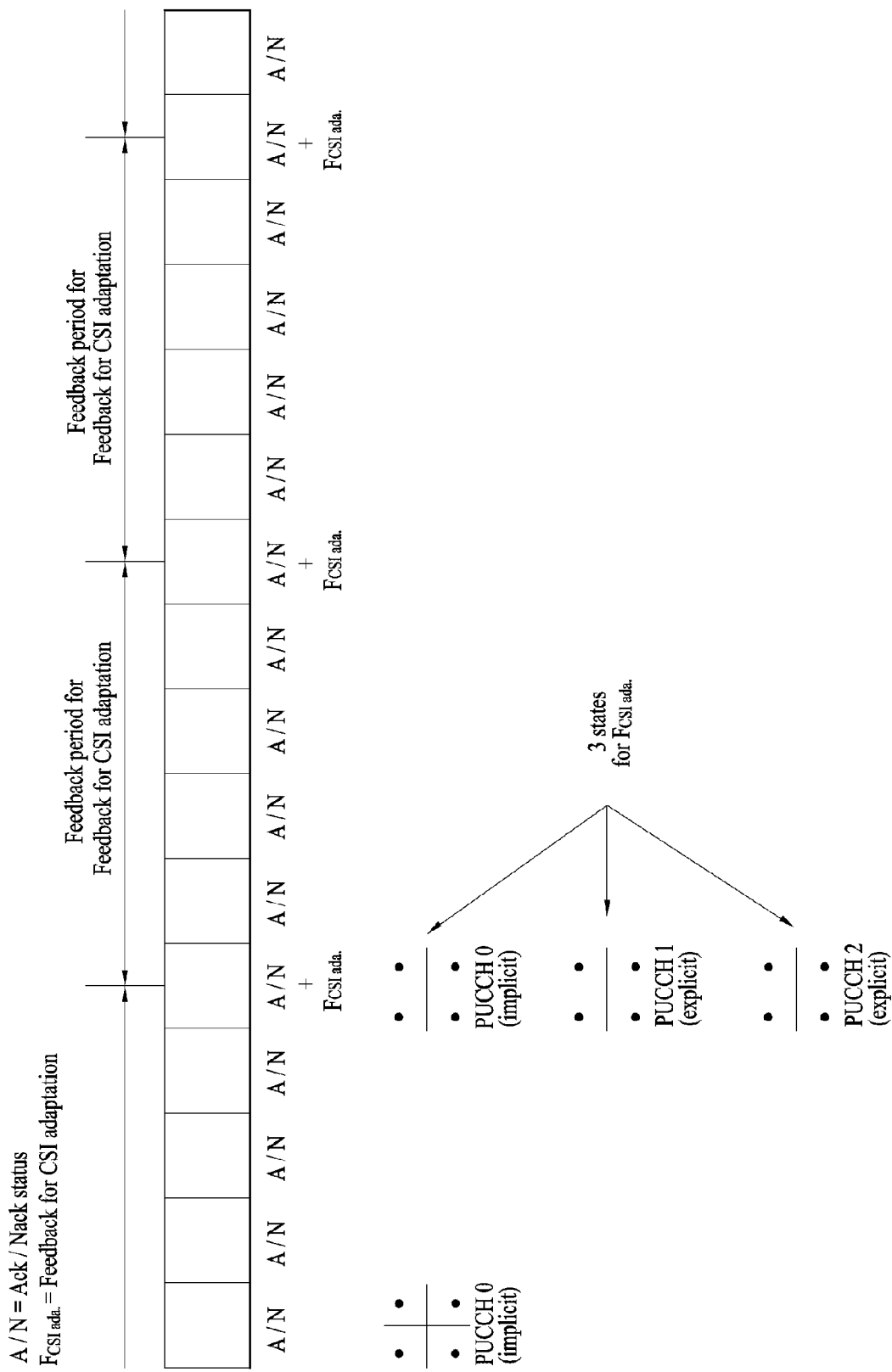

Feedback operation based on the above table is illustrated in FIG. 10. The above table does not include all states expressible by the 2-bit feedback for CSI adaptation. In this case, the mapping relations indicated by the above table may be differently configured per subframe to include all states of the feedback for CSI adaptation. That is, although '00', '01', and '10' can be indicated as the feedback for CSI adaptation as shown in the above table in a specific subframe, '00', '10', and '11' may be indicated in another subframe.

D. M>=2

Figure 11:
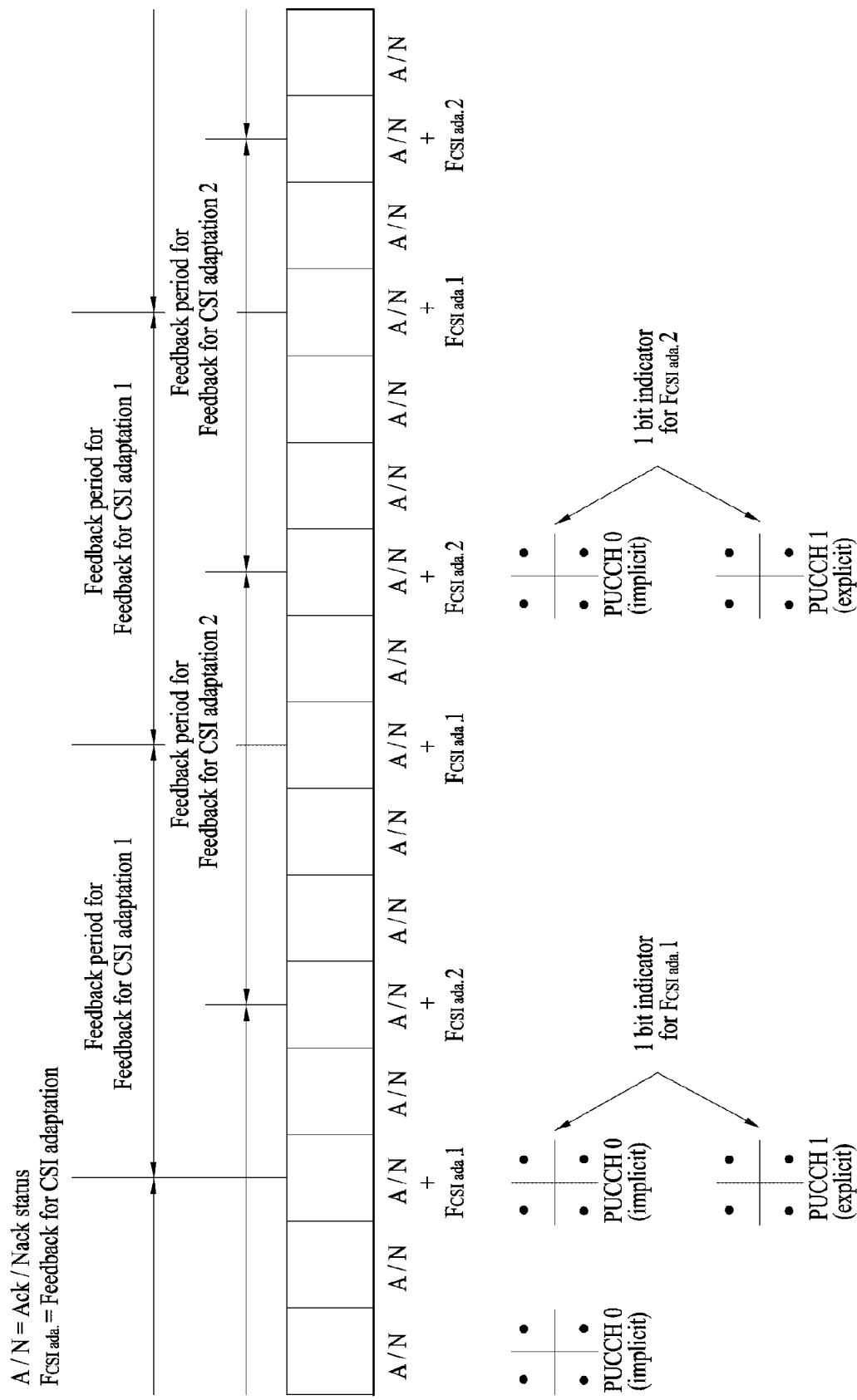

When M bits are configured to transmit M pieces of 1-bit information at different timings (e.g., with independent feedback periods or with the same period based on different offset values), the NAICS UE may transmit the feedback for CSI adaptation of M>=2 using M procedures of the above-described feedback of M=1. In this case, a total of M different feedback procedures are generated. For example, feedback operation for 2 TBs and M=2 may be as illustrated in FIG. 11.

That is, a feedback period and an offset for each of M bits may be configured, and a transmission or feedback timing of each bit may be correspondingly determined Alternatively, the UE may transmit a data detection result (e.g., ACK/NACK) of 1 or 2 TBs and M-bit feedback for CSI adaptation together using PUCCH format 3. In this case, an ACK/NACK resource indicator (ARI) for PUCCH format 3 may be signaled to the NAICS UE by adding the ARI to DCI at a specific timing based on a period of the feedback for CSI adaptation. Otherwise, it may be predefined that the NAICS UE interprets a transmit power control (TPC) bit field of the DCI as the ARI and then the ARI of PUCCH format 3 for the feedback for CSI adaptation may be provided to the NAICS UE.

In the 3GPP LTE(-A) system, an RI is regarded as a channel factor which varies relatively slowly in a CSI feedback procedure, and thus may be configured to have a long period compared to a CQI and a PMI. However, if a change in traffic, a change in an interference environment, or a change in a NAICS target occurs in the RI transmission period, the RI value may greatly vary. Accordingly, to signal the above-described variation in the RI within the RI transmission period to the serving cell, the present invention proposes a method for transmitting a 1-bit indicator indicating that the RI has varied, together with CQI or PMI feedback having a smaller transmission period than the RI, by the NAICS UE.

FIG. 12 illustrates operation according to an embodiment of the present invention.

A terminal 121 may feed back channel state information (CSI) to a serving BS 122 (S1210). As illustrated in FIG. 7, the channel state experienced by the terminal 121 may dynamically vary depending on traffic load of an interference BS. When the serving BS 122 schedules the terminal 121 based on the CSI, due to the above-described dynamic variation in the channel state, scheduling of the serving BS 122 at a timing at which the terminal 121 actually receives downlink data from the serving BS 122 may not be appropriate to the terminal 121.

Accordingly, the terminal 121 may monitor the channel state thereof more frequently than a period for reporting the CSI, and such additional channel state monitoring may be preliminarily configured by the serving BS 122. The terminal 121 may calculate the difference between CSI most recently reported to the serving BS 122 by the terminal 121 and CSI based on the additional channel state monitoring. Furthermore, the terminal 121 may calculate CSI correction information for correcting the already reported CSI based on the difference in the CSI (S1220).

The terminal 121 may transmit the CSI correction information to the serving BS 122 (S1230). The CSI correction information may indicate to change the channel state based on dynamic interference.

Furthermore, the CSI correction information may include an indicator indicating whether the difference between the most recently fed back CSI and the CSI of the specific timing is within a range in which the serving BS 122 can correct the CSI. The terminal 121 may receive information about the range in which the serving BS 122 can correct the CSI, from the serving BS 122 through higher layer signaling.

Alternatively, the CSI correction information may include indicators indicating a plurality of ranges corresponding to the difference between the most recently fed back CSI and the CSI of the specific timing, and the plurality of ranges may include one or more ranges belonging to a range in which the serving BS 122 can correct the CSI, and a range in which the serving BS 122 cannot correct the CSI.

Otherwise, the CSI correction information may be transmitted as a combination of acknowledgement/negative acknowledgement (ACK/NACK) feedback information and an uplink resource selected to transmit the ACK/NACK feedback information. If the CSI correction information uses 2 or more bits, the bits of the CSI correction information may be transmitted based on different transmission periods and transmission offsets.

The terminal 121 may receive a downlink channel scheduled based on the CSI correction information (S1240). As such, the terminal 121 may be scheduled more appropriately for an actual channel state experienced by the terminal 121, and thus overall system performance may be improved.

FIG. 13 is a block diagram of a transmitting device 10 and a receiving device 20 configured to implement exemplary embodiments of the present invention. Referring to FIG. 13, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

According to an embodiment of the present invention, overall system performance may be improved by reflecting interference cancellation performance in channel state report.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for reporting a channel state in a wireless communication system, the method being performed by a terminal and comprising:
reporting channel state information (CSI) to a base station (BS);
receiving at least one transport block from the BS;
transmitting acknowledgement/negative acknowledgement (ACK/NACK) feedback information for the at least one transport block to the BS, a resource for transmitting the ACK/NACK feedback information being determined based on CSI correction information for correcting the reported CSI; and receiving a downlink channel scheduled based on the CSI correction information, wherein the CSI correction information indicates a change in channel state due to dynamic interference, wherein a plurality of PUCCH (Physical Uplink Control Channel) resources are configured for the terminal, wherein a value of the CSI correction information is mapped to the plurality of PUCCH resources, and wherein the value of the CSI correction information is indicated to the BS by the resource used for transmitting the ACK/NACK feedback information determined from the plurality of PUCCH resources.

2. The method according to claim 1, wherein the CSI correction information includes an indicator indicating whether a difference between most recently reported CSI and CSI of a specific timing is within a range in which the BS is able to correct CSI.

3. The method according to claim 1, further comprising receiving information about a range in which the BS is able to correct CSI, from the BS through higher layer signaling.

4. The method according to claim 1, wherein:

the CSI correction information includes indicators indicating a plurality of ranges corresponding to a difference between most recently reported CSI and CSI of a specific timing; and the plurality of ranges include one or more ranges belonging to a range in which the BS is able to correct CSI, and a range in which the BS is not able to correct CSI.

5. A terminal configured to report a channel state in a wireless communication system, the terminal comprising:

a radio frequency (RF) unit; and a processor configured to:

control the RF unit;

report channel state information (CSI) to a base station (BS);

receive at least one transport block from the BS;

determine a resource for transmitting acknowledgement/negative acknowledgement (ACK/NACK) feedback information based on CSI correction information for correcting the reported CSI;

transmit the ACK/NACK feedback information for the at least one transport block to the BS; and receive a downlink channel scheduled based on the CSI correction information, wherein the CSI correction information indicates a change in channel state due to dynamic interference, wherein a plurality of PUCCH (Physical Uplink Control Channel) resources are configured for the terminal, wherein a value of the CSI correction information is mapped to the plurality of PUCCH resources, and wherein the value of the CSI correction information is indicated to the BS by the resource used for transmitting the ACK/NACK feedback information determined from the plurality of PUCCH resources.

6. The terminal according to claim 5, wherein the CSI correction information includes an indicator indicating whether a difference between most recently reported CSI and CSI of a specific timing is within a range in which the BS is able to correct CSI.

7. The terminal according to claim 5, wherein the processor is further configured to receive information about a range in which the BS is able to correct CSI, from the BS through higher layer signaling.

8. The terminal according to claim 5, wherein:

the CSI correction information includes indicators indicating a plurality of ranges corresponding to a difference between most recently reported CSI and CSI of a specific timing; and the plurality of ranges include one or more ranges belonging to a range in which the BS is able to correct CSI, and a range in which the BS is not able to correct CSI.

* * * * *